Feb. 22, 1938.  C. M. BROWN  2,109,379
DISPLAY RACK
Filed Jan. 27, 1936  2 Sheets-Sheet 1
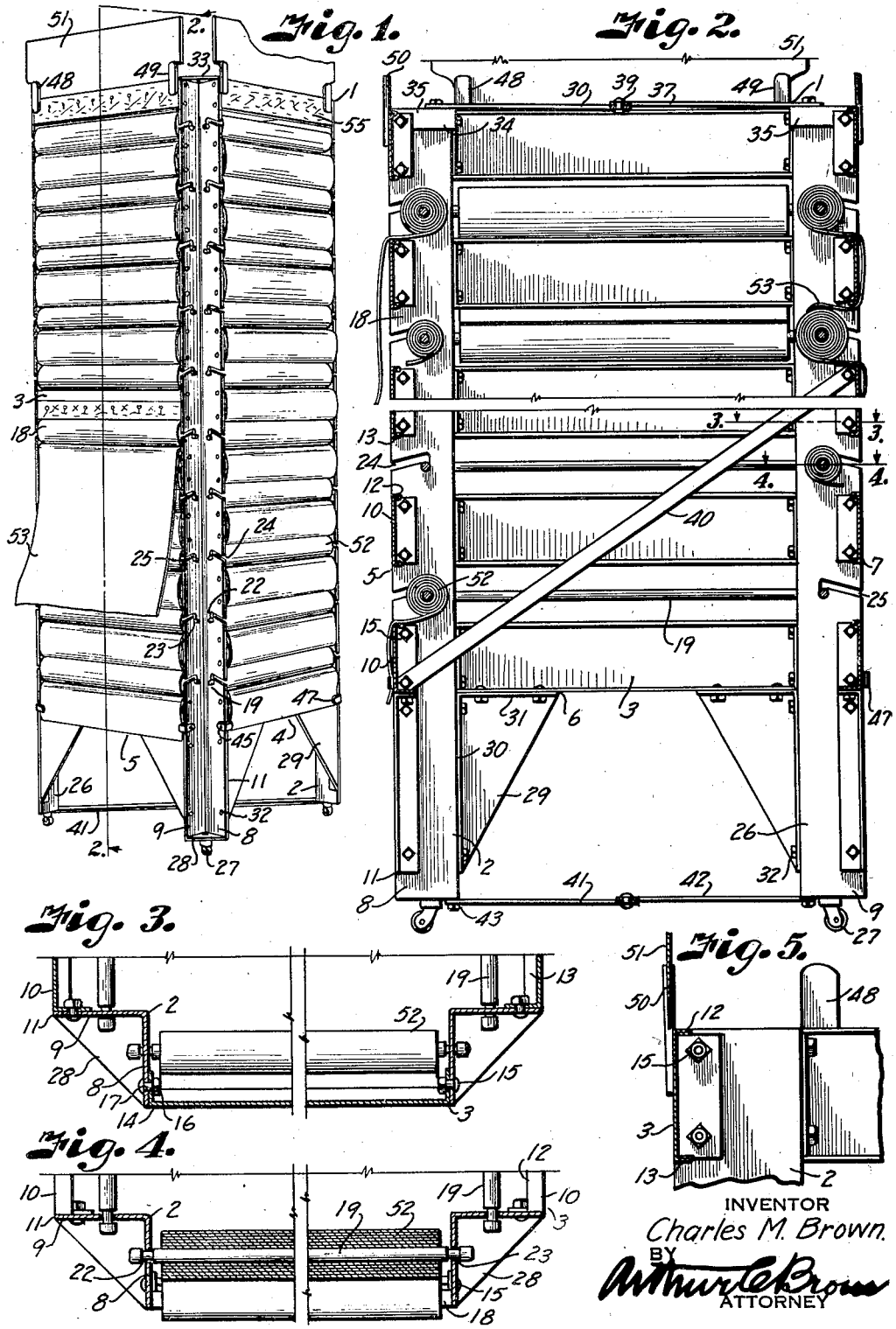
INVENTOR
Charles M. Brown.
BY
ATTORNEY Feb. 22, 1938. C. M. BROWN 2,109,379
DISPLAY RACK
Filed Jan. 27, 1936 2 Sheets-Sheet 2
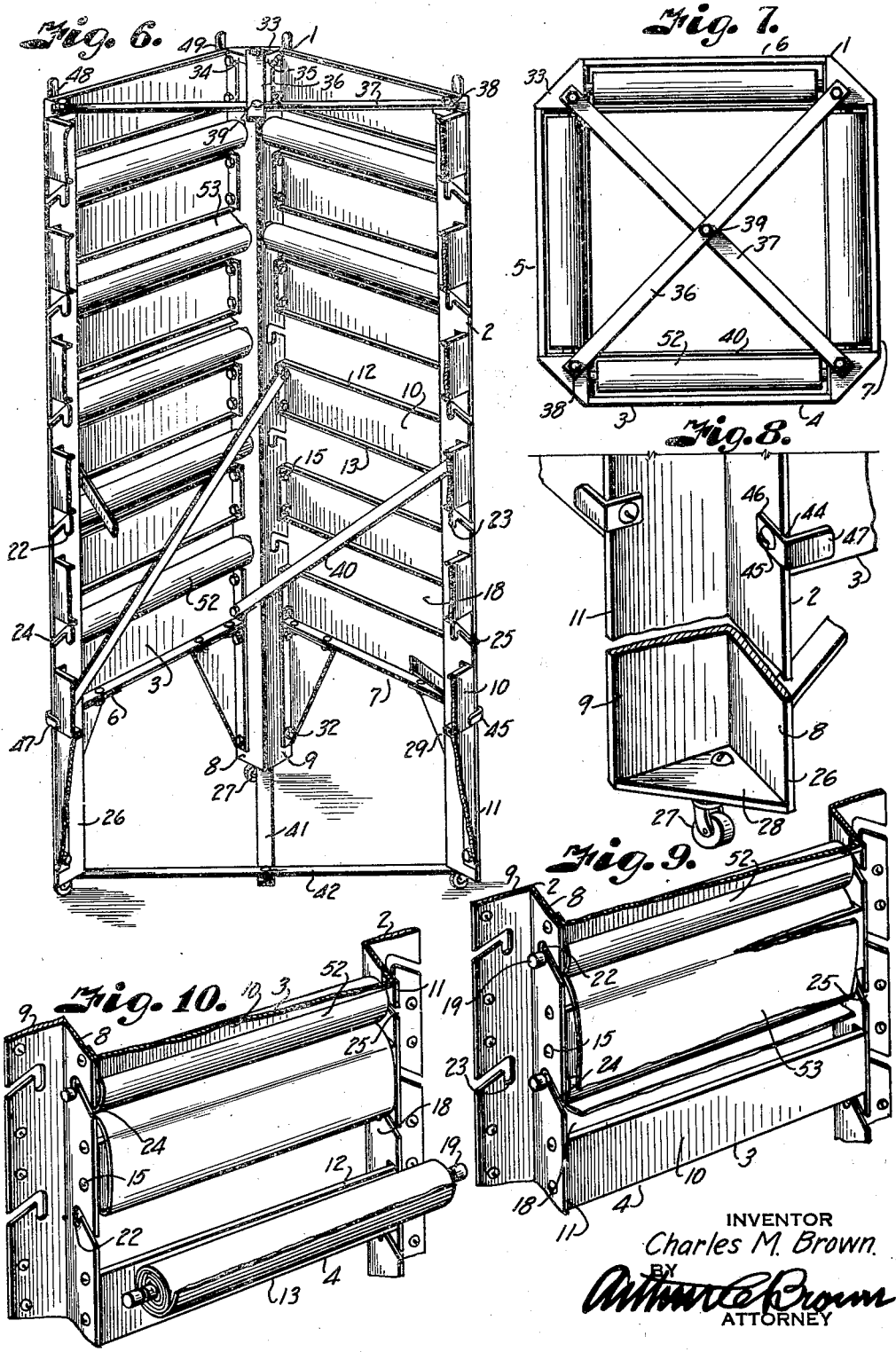
INVENTOR
Charles M. Brown.
BY
Arthur C. Brown
ATTORNEY Patented Feb. 22, 1938

2,109,379

UNITED STATES PATENT OFFICE 2,109,379

DISPLAY RACK

Charles M. Brown, Lincoln, Nebr.

Application January 27, 1936, Serial No. 61,016

3 Claims. (Cl. 242—55.4)

This invention relates to display racks particularly for displaying materials in rolls, such as wall-paper and the like, and has for its principal object to provide an attractive display of this character having a plurality of display faces upon which a large number of rolled materials together with their harmonious accessories, such as borders, ceilings, and the like, are simultaneously displayed in a minimum space.

Other objects of the invention are to provide a display rack wherein the ends of the rolls are concealed; to provide a display rack wherein the roll supporting rods are the only movable parts; to provide a display rack with a sign identifying the grade or brand of goods on display; to provide a rack giving comparison of the roll materials and their accessories; to provide a rack from which samples may be readily removed from the rolls; to provide a display in which a portion of each roll is exposed in a neat manner; to provide a display in which the exposed portion may be readily removed when soiled; and to provide a strong, durable, rigid and open type display structure which is of light weight and easily maneuvered on the floor.

In accomplishing these and other objects of the invention, I have provided improved details of structure, the preferred form of which is illustrated in the accompanying drawings wherein:

Fig. 1 is a perspective view of a display rack constructed in accordance with the present invention, the rack being shown filled with rolls of wall-paper.

Fig. 2 is an enlarged vertical section through the rack on the line 2—2 of Fig. 1.

Fig. 3 is a detail horizontal section on the line 3—3 of Fig. 2.

Fig. 4 is a similar section on the line 4—4 of Fig. 2.

Fig. 5 is a detail fragmentary view of one of the upper corners of the rack showing the sign mounting.

Fig. 6 is a perspective view of the rack with parts of two sides broken away to better illustrate its inner construction.

Fig. 7 is a plan view of the rack.

Fig. 8 is a detail fragmentary perspective view of one of the legs of the rack.

Fig. 9 is a fragmentary perspective view of one side of the rack showing a roll of wall-paper supported therein and illustrating the method of severing a sample from the roll.

Fig. 10 is a similar view showing one of the rolls removed from the rack.

Referring more in detail to the drawings:

1 designates a display rack embodying the features of the present invention and which includes a plurality of upright corner members 2, for example four in number, that are connected by vertically spaced horizontal cross members 3 to 5 provide display sides 4, 5, 6 and 7. The corner members are of angle shape and arranged with the flanges 8 and 9 thereof extending outwardly whereby the flange 8 of one member cooperates with the flange 9 of another member to support the rolls of material such as the wall-paper to be displayed.

The cross members 3 preferably comprise channels arranged with their web portions 10 flush with the edges 11 of the corner members and with their upper and lower flanges 12 and 13 extending inwardly of the rack, as best illustrated in Figs. 2 and 6. The ends of the channels have their web portions 10 flanged inwardly, as at 14, to abut against the flanges 8 and 9 of the corner members and have connection therewith by fastening devices, such as bolts 15, that are extended through aligning openings 16 and 17, as best shown in Fig. 3.

The cross members are spaced apart a sufficient distance to form openings 18 through which the rolls of material are inserted for support in the frame, the rolls being supported on rods 19 having annularly grooved ends 20 and 21 engaging in seats 22 and 23 formed in the respective flanges 8 and 9, the ends of the rod being inserted in the seats through slots 24 and 25 that are formed in the flanges substantially midway of the openings 18, and inclined upwardly to terminate in the seats 22 and 23 that are located in substantially horizontal alignment with the inlet ends of the slots whereby the roll is supported in central position between the respective cross members. The seats are therefore downset from the slots 24 and 25 so that when the grooved ends of the rods drop therein they are retained against accidental displacement. The lowermost cross members are preferably spaced above the lower ends of the corner members 2 in order to provide legs 26 for the display rack.

The legs may be supported on suitable casters 27 that are carried by triangular shaped plates 28 welded or otherwise secured to the ends of the legs. The legs may also be braced by triangular shaped gussets 29 having flanges 30 and 31 respectively abutting against the flanges of the legs and the lower flanges of the bottom cross members, the gussets being secured by suitable fastening devices, such as bolts 32.

The upper ends of the corner members are provided with triangular shaped caps 33 having flanges 34 and 35 engaging over the ends of the corner members. The caps 33 may be anchored to the ends of the corner members or posts by the bolts fastening the upper cross members, as shown in Fig. 6.

The top of the rack may be braced by suitable cross members 36 and 37 having their ends secured to the caps 33 by bolts 38, the crossing points of the cross members being secured by a rivet or the like 39. The rack may also be supportingly braced by diagonally arranged bars 40 having their ends secured by selective bolts securing the cross members as shown in Fig. 2 and Fig. 6. The bottom ends of the legs may also be braced by cross members 41 and 42, having their ends connected with the plates 28 by bolts 43.

Angle clips 44 are secured to the flanges of the corner members at points adjacent the ends of the lower cross members by bolts 45 extending through one terminal 46 of the clips to support the other terminal 47 in slightly spaced relation with the outer faces of the cross members, as best shown in Fig. 8.

In order to provide a sign for identifying the grade or brand of goods on display, the upper cross members are provided with brackets 48 and 49 having slotted ends 50 in which suitable sign cards 51 are inserted.

In using a rack constructed and assembled as described, the rods 19 are extended through axial openings in the rolls of paper 52 and the rolls inserted through the openings 18 so that the grooved ends of the rods enter the slots 24 and 25. When the ends of the rods reach the rear ends of the slots, they drop into the seats 22 and 23 to retain the rolls.

Since the pattern on the paper is printed on the inside surface, the end 53 of the roll is drawn downwardly over the respective cross members and tucked between the lower flanges thereof and the next lower roll, as shown in Fig. 2, to provide display portions 54 lying flat against the webs of the cross members so that the patterns are displayed in flat condition with the ends of the rolls concealed by the flanges 8 and 9 of the corner members. The ends of the lower rolls are displayed in similar manner but they are secured by tucking the edges thereof under the terminals 47 of the clips 44.

The cross members may be covered with borders harmonizing with the adjacent rolls supported in that side of the rack, as illustrated at 55, Fig. 1. Certain of the borders are, therefore, concealed under the display portions of the rolls but may be readily brought into view after the paper has been selected by the customer.

When it is desired to remove a sample from any one of the rolls the end 53 thereof may be withdrawn from its tucked position and torn from the roll, using the upper edge of the cross member as a means for severing the sample. After the sample has been severed the remaining end of the roll may be drawn downwardly over the cross member and tucked thereunder, as previously described. Likewise when displayed portions of the roll become soiled, they may be severed from the roll and new sections drawn over the web or display portions of the cross members.

When it is desired to remove one of the rolls, the rod carrying the roll may be lifted out of the seats, whereupon the rod is free to roll down the slots 24 and 25 to bring the roll in position where it may be caught by the person removing it.

From the foregoing it is apparent that I have provided a strong and durable display rack which retains the rolled material in a neat display so that a greater number of patterns may be simultaneously displayed for selection by a customer.

While I have particularly illustrated my invention in connection with wall-paper displays, it is apparent that it is adapted for displaying any kind of roll materials, such as oilcloth, fabrics, nettings, papers, and like goods.

What I claim and desire to secure by Letters Patent is:

1. In a display rack, a plurality of spaced upright angle members having outwardly opening spaced slots terminating in rod supporting seats, rods having peripheral grooves at the outer ends engaged with said seats, vertically spaced horizontal plate members secured to the upright members between the slots over which rolls of merchandise may be drawn for display, angle clips for anchoring the end of the lowermost roll of merchandise carried on said rods in position to be displayed, bracing means connecting the upright members with the lowermost horizontal plate members, means in the interior of the rack for bracing the said plate members, caps at the upper ends of the upright angle members, and cross bars connected with said caps and extending diagonally thereof for bracing the rack.

2. In a display rack of the character described, a plurality of upright angle members having outwardly extending flanges provided with aligned rod supporting seats, rods mounted in said seats, horizontal cross members mounted on the outer edges of said flanges between said seats for connecting the angle members and for forming a backing flush with the edges of said flanges over which rolls of merchandise carried by said rods may be drawn for display, and means for anchoring the ends of the lowermost rolls of merchandise.

3. In a display rack, a plurality of spaced upright members having rod supporting seats, rods engaged within said seats, plate members secured to the upright members between said rod seats over which rolls of merchandise may be drawn for display, angle clips for anchoring the end of the lowermost roll of merchandise, bracing means connecting the upright members with the lowermost horizontal plate members, means in the interior of the rack for bracing the said plate members, caps at the upper ends of the upright angle members, and cross bars connected with said caps and extending diagonally thereof for bracing the rack.

CHARLES M. BROWN.